United States Patent
Larionov (10) Patent No.: US 10,992,713 B2
(45) Date of Patent: Apr. 27, 2021

(54) METHOD OF AND SYSTEM FOR AUTHORIZING USER TO EXECUTE ACTION IN ELECTRONIC SERVICE

(71) Applicant: YANDEX EUROPE AG, Lucerne (CH)

(72) Inventor: Andrey Nikolaevich Larionov, Tyumen (RU)

(73) Assignee: YANDEX EUROPE AG, Lucerne (CH)

(*) Notice: Subject to any disclaimer, the term of this patent is extended or adjusted under 35 U.S.C. 154(b) by 212 days.

(21) Appl. No.: 16/026,537

(22) Filed: Jul. 3, 2018

(65) Prior Publication Data
US 2019/0199755 A1    Jun. 27, 2019

(30) Foreign Application Priority Data
Dec. 27, 2017 (RU) .................... 2017146279

(51) Int. Cl.
*H04L 29/06* (2006.01)
*H04L 29/08* (2006.01)

(52) U.S. Cl.
CPC ............ *H04L 63/20* (2013.01); *H04L 63/102* (2013.01); *H04L 63/105* (2013.01); *H04L 67/10* (2013.01)

(58) Field of Classification Search
CPC ..... H04L 63/20; H04L 63/102; H04L 63/105; H04L 67/10
See application file for complete search history.

(56) References Cited

U.S. PATENT DOCUMENTS

| 6,049,877 | A | 4/2000 | White |
| 6,065,027 | A * | 5/2000 | Cashman ............ H04L 29/06 |
| | | | 379/93.08 |
| 7,174,383 | B1 | 2/2007 | Biswas et al. |
| 7,530,099 | B2 | 5/2009 | Flurry et al. |

(Continued)

FOREIGN PATENT DOCUMENTS

RU    2308755 C2    10/2007

OTHER PUBLICATIONS

Lewis et al., "Web Single Sign-On Authentication using SAML", IJCSI International Journal of Computer Science Issues, vol. 2, 2009, pp. 41-48.

(Continued)

*Primary Examiner* — Anthony D Brown
*Assistant Examiner* — Rodman Alexander Mahmoudi
(74) *Attorney, Agent, or Firm* — BCF LLP (57) ABSTRACT

A method and system for authorizing a subject user to perform an action within an electronic service, receiving, a request to access the electronic service, the request including an indication of the subject user, of an object, and of the action that the subject user is desirous of performing on the object within the electronic service, based on at least one of the indication of the subject user and the object, retrieving, by the server, a set of predetermined rules each predetermined rule having been coded and stored, by the server, as a respective bytecode portion, executing the set of predetermined rules, analyzing an outcome rendered by the execution of each rule of the set of predetermined rules, and responsive to the outcome being indicative of a positive result, authorizing the subject to perform the action on the object.

20 Claims, 3 Drawing Sheets

(56) References Cited

U.S. PATENT DOCUMENTS

| | | |
|---|---|---|
| 8,225,385 B2 | 7/2012 | Chow et al. |
| 8,966,568 B2 | 2/2015 | Abendroth et al. |
| 9,237,020 B2 | 1/2016 | Chang et al. |
| 9,553,855 B2 | 1/2017 | Pal et al. |
| 9,578,014 B2 | 2/2017 | Sondhi et al. |
| 2005/0144463 A1 | 6/2005 | Rossebo et al. |
| 2007/0204078 A1* | 8/2007 | Boccon-Gibod ....... G06F 21/10 710/54 |
| 2014/0024341 A1 | 1/2014 | Johan |
| 2015/0052588 A1 | 2/2015 | Zmener |
| 2016/0211978 A1 | 7/2016 | Bowen |
| 2017/0372442 A1* | 12/2017 | Mejias ................... G06F 19/32 |

OTHER PUBLICATIONS

Satoh et al., "Single Sign On Architecture with Dynamic Tokens", IBM Research, Tokyo Research Laboratory, Japan, 4 pages.
Search Report with regard to the counterpart RU Patent Application No. 2017146279 completed Apr. 16, 2019.

* cited by examiner

METHOD OF AND SYSTEM FOR AUTHORIZING USER TO EXECUTE ACTION IN ELECTRONIC SERVICE

CROSS-REFERENCE

The present application claims priority to Russian Patent Application No. 2017146279, entitled "Method of and System for Authorizing User to Execute Action in Electronic Service," filed Dec. 27, 2017, the entirety of which is incorporated herein by reference.

FIELD

The present technology relates to access control to electronic services in general and, more specifically, to a method of and a system for authorizing a subject user to execute an action in a electronic service.

BACKGROUND

A cloud platform delivers computing as a service to one or more clients. For example, a cloud platform may deliver an infrastructure (e.g., storage media), provide software, or make particular computing platforms available to clients. A cloud platform does not merely connect various components as in conventional networks, but provides instead computing services and infrastructures, which are independent of the devices used by the clients (or users). Therefore, by using cloud platforms it becomes possible to delegate setting up and maintenance of computing systems to an external provider and therewith to increase significantly the efficiency, capability, or flexibility of an information technology (IT) infrastructure.

Service providers, such as Google™, Yahoo™, and Yandex™, typically provision users with a variety of services: cloud, advertising, mapping, calendars, translation, e-mail, social network, and cloud storage space, among others. A user may operate in various contexts, wherein in each of them the user plays a different role and has different responsibilities. These different roles might relate to the professional or personal life of the user in the role of employee, contractor, customer, supplier, or family member, for example. Within these various contexts, a user may use different client devices (e.g., desktop computers, laptop computers, personal computers, mobile phones, tablets, etc.) or client devices that utilize remote processing capability (e.g., applications hosted on a web site or a virtual machine hosted in a data center). Different computing environments might be installed on client devices with local processing capabilities (e.g., different operating systems, virtual software environments, Web applications, native applications, containers, BIOS/APIs, etc.) to interact with a cloud platform.

Users associated with the cloud service may generally want to execute actions on files, processes, and other programs via their electronic devices. However, a user may not be allowed to execute a process on a forbidden resource of the cloud service, or modify or delete important files. The cloud service may thus be configured to control access via different methods.

U.S. Pat. No. 9,553,855 B2 titled "Storing a key to an encrypted file in kernel memory" and granted on Jan. 24, 2017 to Red Hat Inc. teaches storing a key to an encrypted file in a kernel memory. Authentication data may be received and authentication credentials of the authentication data may be stored in a file. The file may be encrypted and a key to the encrypted file may be generated. The encrypted file may be stored in a user space and the key may be stored in a kernel space. The key may be retrieved from the kernel space and applied to the encrypted file in the user space to decode the encrypted file and subsequently access the authentication credentials stored in the encrypted file.

U.S. Pat. No. 7,530,099 B2 titled "Method and system for a single-sign-on mechanism within application service provider (ASP) aggregation" and granted on May 5, 2005 to IBM teaches a methodology for providing a single-sign-on mechanism within an ASP aggregator service. An aggregator token is generated by an ASP aggregator service and sent to a client device after its user has been successfully authenticated during a single-sign-on operation that is provided by the ASP aggregator service. The aggregator token then accompanies any request from the client to aggregated applications within the ASP aggregator service's infrastructure. The aggregator token comprises an indication of an address or resource identifier within the ASP aggregator service to which a client/user can be redirected when the client/user needs to be authenticated by the ASP aggregator service. In other words, the address/identifier is associated with a logon resource; when a request from a client is sent to this address, the ASP aggregator service responds with an authentication challenge to force the user to complete a single-sign-on operation.

U.S. Pat. No. 8,225,385 B2 titled "Multiple security token transactions" and granted on Jul. 17, 2012 to Microsoft teaches embodiments of multiple security token transactions. One or more of the described techniques may be utilized to provide, in a single request and response, an authentication token and a plurality security tokens for proof of identity at respective service provider

SUMMARY

Developers of the present technology have appreciated at least one technical problem associated with the prior art approaches.

More specifically, developers of the present technology have appreciated that when access control is executed at a server, prior art solutions often use role-based access control mechanisms, which may be limiting when users do not fit a predetermined role defined by a system administrator.

An alternative to role-based access control is rule-based access control, which is more flexible, at it is a more granular approach that allows controlling access based on specific rules, which may vary from user to user. However, rule-based access control is often slower, as the server needs to compile a specific set of rules each time a user polls the server.

Thus, embodiments of the present technology are directed to a method and a system for controlling authorization at an electronic service.

According to a first broad aspect of the present technology, there is provided a method for authorizing a subject user to perform an action within an electronic service, the subject user being associated with at least one client device, the subject user being associated with the electronic service, the electronic service being executed at a server, the at least one client device being connected to the server via a communication network, the method comprising: receiving, by the server from the at least one client device, a request to access the electronic service, the request including an indication of the subject user, of an object, and of the action that the subject user is desirous of performing on the object within the electronic service, based on at least one of the indication of the subject user and the object, retrieving, by the server, a set of predetermined rules associated with the at least one of the subject user and the object from a plurality of predetermined rules, each predetermined rule having been coded and stored, by the server, as a respective bytecode portion, the predetermined rules having been precompiled into the bytecode portions executing, by the server, the set of predetermined rules, the set of predetermined rules comprises at least one of: a first rule for verifying the subject, a second rule for verifying the object, and a third rule for verifying the action that the subject user is desirous of performing on the object, analyzing an outcome rendered by the execution of each rule of the set of predetermined rules, and responsive to the outcome being indicative of a positive result, authorizing the subject to perform the action on the object.

In some implementations, the set of predetermined rules is retrieved from a rule mapping database, the rule mapping database mapping each of subject users and each of objects to an associated rule of the predetermined rules.

In some implementations, each rule of a subset of the set of predetermined rules corresponds to a respective action to be performed by the subject user on a respective object.

In some implementations, the predetermined rules have been further precompiled into a machine code, and the plurality of predetermined rules are stored as the machine code.

In some implementations, the predetermined rules are executable independently by the server.

In some implementations, the predetermined rules are executable in parallel by the server.

In some implementations, the predetermined rules are executed in parallel by plurality of processors of the server.

In some implementations, the subject user is one of: a user, a group of users and a process.

In some implementations, the object is one of: a file, a type of file, a directory, a process, and a program.

In some implementations, where in the action is one of: reading, writing, appending, executing, deleting, creating, and searching In some implementations, the electronic service is a cloud service.

In some implementations, the method is executable at the kernel level of the server.

In some implementations, the method is executable in a virtual machine of the server.

In some implementations, the analyzing the outcome rendered by the execution of the set of predetermined rules comprises determining of a given outcome of a given pre-determined rule is one of a positive, negative and default negative.

In some implementations, the outcome is considered to be indicative of the positive result in response to a totality of given outcomes of the set of predetermined rules not rendering a negative outcome.

In some implementations, the outcome is considered to be indicative of the positive result in response to the totality of given outcomes of the set of predetermined rules rendering one of a positive and a default negative outcomes.

According to a second broad aspect of the present technology, there is provided a system for authorizing a subject user to perform an action within an electronic service, the subject user being associated with at least one client device, the subject user being associated with the electronic service, the at least one client device being connected to the system via a communication network, the system comprising: at least one processor, a non-transitory computer-readable medium comprising instructions, the at least one processor, upon executing the instructions, being configured to: receive, from the at least one client device, a request to access the electronic service, the request including an indication of the subject user, of an object, and of the action that the subject user is desirous of performing on the object within the electronic service, based on at least one of the indication of the subject user and the object, retrieve, a set of predetermined rules associated with the at least one of the subject user and the object from a plurality of predetermined rules, each predetermined rule having been coded and stored as a respective bytecode portion, the predetermined rules having been precompiled into the bytecode portions, execute, the set of predetermined rules, wherein the set of predetermined rules comprises at least one of: a first rule for verifying the subject, a second rule for verifying the object, and a third rule for verifying the action that the subject user is desirous of performing on the object, analyze an outcome rendered by the execution of each rule of the set of predetermined rules, and responsive to the outcome being indicative of a positive result, authorize the subject to perform the action on the object.

In some implementations, the set of predetermined rules is retrieved from a rule mapping database, the rule mapping database mapping each of subject users and each of objects to an associated rule of the predetermined rules.

In some implementations, each rule of a subset of the set of predetermined rules corresponds to a respective action to be performed by the subject user on a respective object.

In some implementations, the predetermined rules have been further precompiled into a machine code, and the plurality of predetermined rules are stored as the machine code.

In some implementations, the predetermined rules are executable independently by the at least one processor.

In some implementations, the predetermined rules are executable in parallel by the at least one processor.

In some implementations, wherein: the at least one processor is a plurality of processors, and the predetermined rules are executed in parallel by the plurality of processors.

In some implementations, the subject user is one of: a user, a group of users and a process.

In some implementations, the object is one of: a file, a type of file, a directory, a process, and a program.

In some implementations, where in the action is one of: reading, writing, appending, executing, deleting, creating, and searching In some implementations, the electronic service is a cloud service.

In some implementations, the instructions are executable at the kernel level of the at least one processor.

In some implementations, the instructions are executable in a virtual machine executed by the at least one processor.

In some implementations, the analyzing the outcome rendered by the execution of the set of predetermined rules comprises determining of a given outcome of a given pre-determined rule is one of a positive, negative and default negative.

In some implementations, the outcome is considered to be indicative of the positive result in response to a totality of given outcomes of the set of predetermined rules not rendering a negative outcome.

In some implementations, the outcome is considered to be indicative of the positive result in response to the totality of given outcomes of the set of predetermined rules rendering one of a positive and a default negative outcomes.

While the present technology is contemplated to be employed in a cloud storage service, it is noted that the present technology may be employed in any other suitable environment requiring access control to authorize users, devices, and processes to execute specific actions.

In the context of the present specification, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "a electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Figure 1:
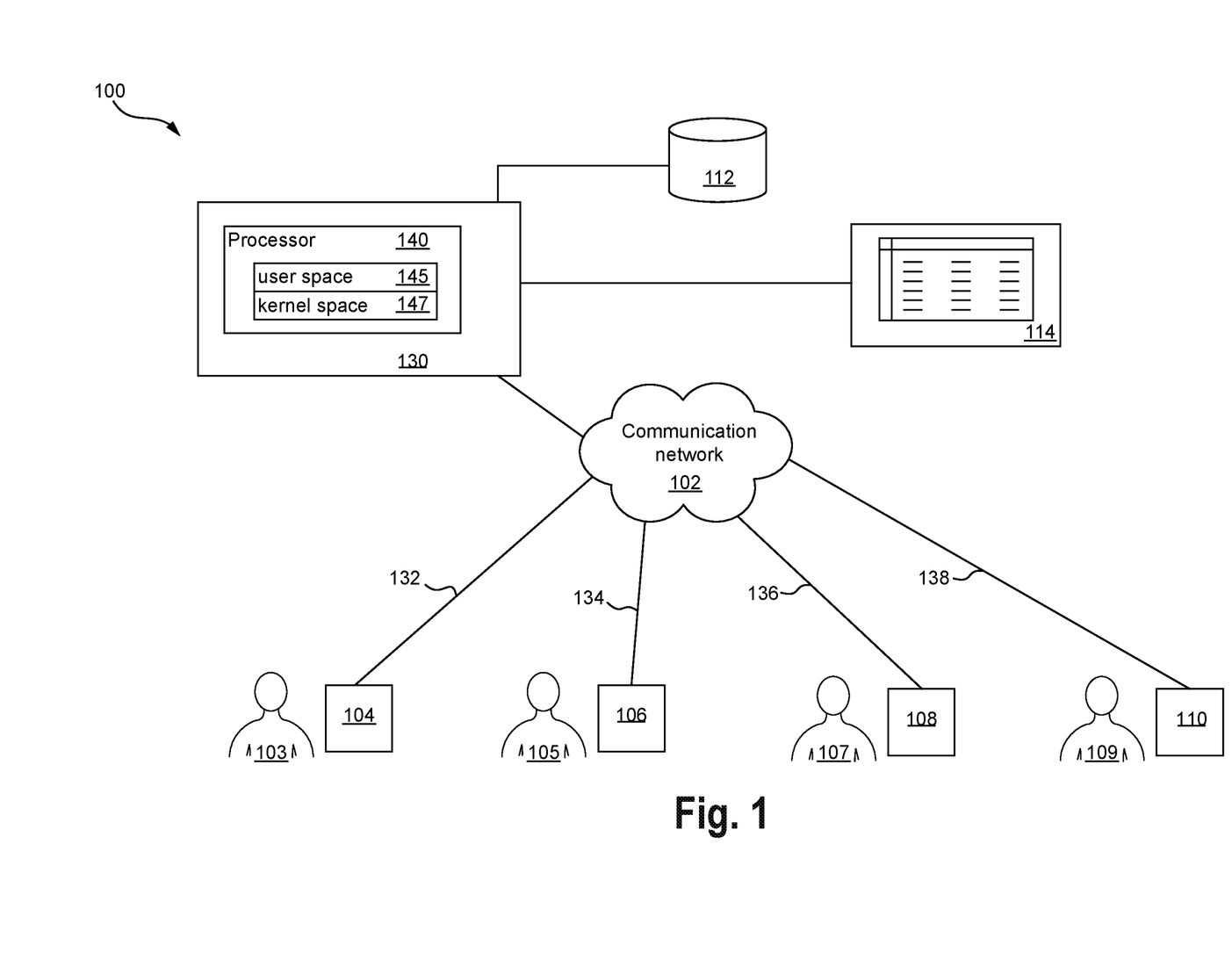
FIG. 1 depicts a diagram of a system implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 comprises a communication network 102. The communication network 102 is typically associated with a plurality of client devices associated respectively with a plurality of users. A first client device 104, a second client device 108, a third client device 106, and a fourth client device 110 associated with a first user 103, a second user 107, a third user 105, and a fourth user 109, respectively, are indicated in the figure for illustrative purposes.

The communication network 102 is also associated with a cloud server 130, the cloud server having a processor 140. The cloud server 130 may generally provide cloud computing services to a plurality of users (such as the first user 103, the second user 107, the third user 105, and the fourth user 109) which may include servers, storage, databases, networking, and software. Users may create applications and services, store, back up and recover data, host websites and blogs, stream audio and video, deliver software on demand and analyze data for patterns and make predictions.

In the present embodiment, the cloud server 130 hosts a cloud storage service (not depicted) and is typically associated with a file storage unit 112. The implementation of the cloud server 130 is not particularly limited, but as an example, the cloud server 130 may be implemented as a single server. Alternatively, the cloud server 130 can be implemented as a plurality of servers. Within the latter embodiments, each of the plurality of servers implementing the cloud server 130 may be responsible for storing files from users in a particular region; or a particular type of users; or a particular type or size of files. Alternatively, each of the plurality of servers implementing the cloud server 130 may be configured to store files according to a load-balancing approach executed by a supervisory entity (which can be one of the plurality of servers). The file storage unit 112 is typically a unit capable of storing files and data. Like the cloud server 130, the file storage unit 112 may be implemented as a single unit, or alternatively as a plurality of units.

Client devices 104, 106, 108 and 110 are coupled to communication network 102 via respective communication link 132, 134, 136, 138. In some non-limiting embodiments of the present technology, the communication network 102 can be implemented as the Internet. In other embodiments of the present technology, the communication network 102 can be implemented differently, such as any wide-area communications network, local-area communications network, a private communications network and the like.

How a communication link 132, 134, 136, 138 is implemented is not particularly limited and will vary depending on how the communication network 102 and the respective client devices 104, 106, 108 and 110 are implemented. Merely as an example and not as a limitation, in those embodiments of the present technology where the first client device 104 is implemented as a wireless communication device (such as a smartphone), the communication link 132 can be implemented as a wireless data transmittal path (such as but not limited to, a 3G communications network link, a 4G communications network link, a Wireless Fidelity, or WiFi® for short, a Bluetooth®, and the like). In those examples, where the first client device 104 is implemented as a notebook computer, the communication link 132 can be either wireless (such as Wireless Fidelity, or WiFi® for short, Bluetooth® or the like) or wired (such as an Ethernet based connection). Different client devices and different data transmittal paths may be implemented independently of each other. It should be understood therefore that different client devices can be implemented differently and that data transmittal paths will vary accordingly.

It should be expressly understood that implementations for client devices 104, 106, 108, and 110, communication link 132, 134, 136, 138, and communication network 102 are provided for illustration purposes only. While only four client devices 104, 106, 108, and 110, are illustrated (all are shown in FIG. 1), it is contemplated that any number of client devices 104, 106, 108, and 110 could be connected to the system 100. It is further contemplated that in some implementations, the number of client devices 104, 106, 108, and 110 included in the system 100 could number in the tens or hundreds of thousands. As such, those skilled in the art will easily appreciate other specific implementational details for these elements. As such, examples provided herein above are not meant to limit the scope of the present technology.

The cloud server 130 can be implemented as a conventional computer server. In an example of an embodiment of the present technology, the cloud server 130 is implemented as a Dell™ PowerEdge™ Server running the Linux® operating system (OS). It should be understood that the cloud server 130 can be implemented in any other suitable hardware and/or software and/or firmware or a combination thereof. In the depicted non-limiting embodiment of present technology, the cloud server 130 is a single server. In alternative non-limiting embodiments of the present technology, the functionality of the cloud server 130 may be distributed and may be implemented via multiple servers, e.g., the cloud server 130 may be implemented as a plurality of servers.

The processor 140 of the cloud server 130 has a user space 145 and a kernel space 147, both of which will be described in more detail below. The processor 140 may be any processor capable of carrying out the method of the present technology. It is contemplated that this could include, but is not limited to: a single dedicated processor 140, a single shared processor 140, graphics processing unit (GPU) 140 and a central processing unit (CPU) 140. It is also contemplated that the method be carried out multiple times in parallel on a plurality of individual processors 140 or on a multi-core processor 140, as will be discussed below.

According to the non-limiting embodiments of present technology, the processor 140 and its corresponding memory is partitioned into user space 145 and kernel space 147. In normal operation, the user space 145 governs execution of software applications (not depicted). User space 145 also generally contains any process that may not be stable or trusted enough to have access to system hardware or the operating system. The software applications access system drivers and memory through system calls, which pass user space requests to the kernel processes.

Kernel space 147 is tasked with running an operating system kernel (not depicted), device drivers (not depicted), a process manager (not depicted), and an input/output (I/O) device manager (not depicted). The operating system kernel is a computer program that manages input and output requests from software in the user space and translates them into data processing instructions for the processor 140. The process manager allocates resources to processes and protects processes from interfering with each other. Device drivers and the I/O device manager operate, control or manage devices, such as a computer monitor (not depicted), and the computer keyboard (not depicted), that are connected to the cloud server 130 of the system 100. For system security, kernel space 147 operates using a set of kernel space commands which are known, stable commands that will not generally endanger the normal operations of the system 100.

The cloud server 130 may implement Harvard architecture or the von Neumann architecture, or a mix thereof. Briefly speaking, the Harvard architecture uses physically separate memory and data paths for program and memory, while the von Neumann architecture uses the same memory and data paths for program and data storage.

The cloud server 130 may execute a virtual machine, which runs as a normal application inside the OS and provides platform-independent programming environment allowing to abstract away details of the underlying hardware or OS, and allows a program to execute in the same way on any platform.

The cloud server 130 is communicatively coupled (or otherwise has access) to a file storage unit 112. The general purpose of the file storage unit 112 is to store data, e.g., files and programs, accessible by users 103, 105, 107, and 109 or other users (not depicted) of the cloud server 130. The implementation of the file storage unit 112 is not particularly limited. It should be understood that any suitable hardware for storing data may be used. In some implementations, the file storage unit 112 may be physically contiguous with the cloud server 130, i.e., they are not necessarily separate pieces of hardware, as depicted, although they may be.

The cloud server 130 is configured to execute access control mechanisms to control the flow of information between a subject (e.g. user, group of users, program, process, device) and an object (e.g. file, type of file, directory, program, process, database, device) in the file storage unit 112 to protect the information and prevent unauthorized access. The subject generally requests access to an object to take actions on the object. As such, access control mechanisms allow preventing, among others, computing threats (e.g. Denial of services (DoS) threats, unauthorized software, and software defect, etc.) and personnel threats (e.g. careless users, spies, etc.). The cloud server 130 may execute access control mechanisms based on the rule-mapping database 114, which will be described in more detail in the following paragraphs.

Figure 2:
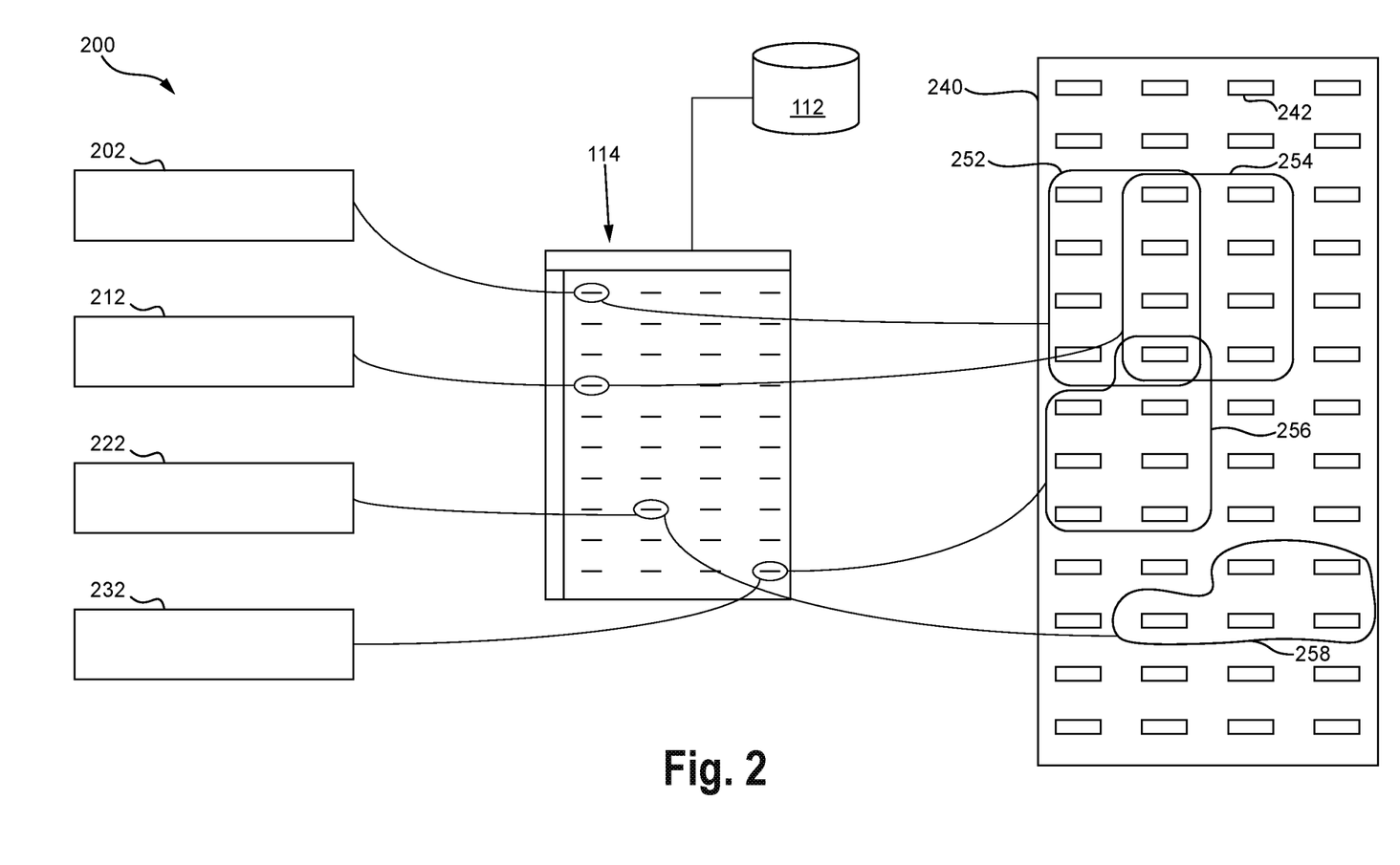
FIG. 2 depicts a schematic representation of an access control environment implemented in accordance with non-limiting embodiments of the present technology.

Now turning to FIG. 2, an access control environment 200 is illustrated in accordance with a non-limiting embodiment of the present technology. The access control environment 200 includes the rule-mapping database 114, the file storage unit 112, and a plurality of predetermined rules 240.

The cloud server 130 is configured to execute mandatory access control (MAC), where a security label is assigned to each subject and user by a system administrator. A security label is an assigned level of sensitivity, e.g. public, sensitive, confidential, secret, etc. More precisely, the cloud server 130 is configured to execute rule based access control (RBAC), where access is allowed or denied to objects based on an outcome of the execution of one or more rules 242 of plurality of predetermined rules 240 defined by one or more system administrator(s). The execution of at least a portion of the plurality predetermined rules 240 determines whether an access request from a subject to an object should be granted or denied. Generally, access control cannot be changed by subjects as all access permissions are controlled solely by the system administrator(s). In some embodiments, rule based access control may also be combined with role based access control, where permissions are assigned to particular roles, and users are assigned to particular roles (e.g. administrator, developer, user, etc.).

Each rule 242 of the set of predetermined rules 240 may indicate what can and cannot happen between a subject and an object. A rule 242 may indicate whether a subject may perform an action on the object (e.g. reading, writing, appending, executing, deleting, creating, and searching) or may indicate other conditions (e.g. location range, IP address, time of day, type of device etc.) for performing the action. Broadly speaking, a rule 242 of the set of predetermined rules 240 may use a "if x then y" logic, which allows an action y to be performed if a condition x is met.

For verifying permissions, the cloud server 130 is configured to use one or more access control lists (ACL) or access control matrices (ACM), which are data structures mapping subjects and objects to associated rules in the plurality of predetermined rules 240. The manner in which the ACLs are implemented is not limited. In the present embodiment, the ACLs are implemented as a rule-mapping database 114. The rule-mapping database 114 may be implemented in different ways.

For a given subject and/or object present in the rule-mapping database 114, the cloud server 130 may retrieve an associated set of predetermined rules from the plurality of predetermined rules 240. Based on the subject and/or object in a request received from one of the client devices 104, 106, 108, 110, the cloud server 130 may analyze the rule-mapping database 114, and retrieve a set of predetermined rules 240 dynamically e.g. the cloud server 130 may execute a specific set of predetermined rules by retrieving, from the rule-mapping database 114, a reference to the rules associated with the object and/or subject, input them in a function, which may in turn retrieve the specific rules of the plurality of predetermined rules 240 associated with the object and/or subject.

In the present embodiment, each rule 242 of the plurality of predetermined rules 240 may have been defined by one or more system administrator(s). Generally, the objective of the non-limiting embodiments of the present technology is to have each rule 242 of the plurality of predetermined rules 240 predefined and at least partially precompiled to allow faster processing by the processor 140 of the cloud server 130, such that it can be executed independently and without any dependency to other rules or processes in the cloud server 130. As such, each rule 242 of the plurality of predetermined rules 240 may be considered as an independent program to be executed by the processor 140 of the cloud server 130. When receiving a request, the cloud server 130 may thus retrieve the associated set of predetermined rules from the plurality of predetermined rules 240, and execute the predetermined rules without or by minimizing interpretation and compilation time by the processor 140, by having the plurality of rules 242 mapped closely to processor instructions. In some embodiments, the plurality of predetermined rules 240 may be in the form of machine code, which may be stored in a ROM or RAM of the cloud server 130. In other embodiments, the plurality of predetermined rules 240 may be the form of bytecode of a virtual machine, which may be stored in a volatile or non-volatile memory of the cloud server 130. The bytecode may be executed by parsing and directly executing the instructions, by interpretation, by just-in-time (JIT) compiling, or any other technique chosen by the system administrator.

As such, the plurality of predetermined rules 240 may be defined in the user space 145 and executed in the kernel space 147 of the processor 140. Generally, the kernel ensures that only forward jumps are permitted to prevent loops and instructions are valid and in range when the processor 140 of the cloud server 130 executes a predetermined rule 240 of the plurality of predetermined rules 240.

The execution of a given rule 242 of the plurality of predetermined rules 240 may generally result in three possible outcomes: POSITIVE, NEGATIVE and DEFAULT NEGATIVE. The POSITIVE outcome of the execution of a rule may indicate that an element of the request matches the given rule (i.e. may be indicative of a positive outcome of the rule execution). The NEGATIVE outcome of the execution of a rule may indicate that an element of a request does not match the rule (i.e. may be indicative of a negative outcome of the rule execution). Generally, when the execution of a rule by the cloud server 130 results in a NEGATIVE outcome, the request from the subject may be automatically rejected, and other elements of the request may not be verified. The DEFAULT NEGATIVE outcome of the execution of a rule may indicate that the rule does not apply to an element of a request, and the cloud server 130 ignores the rule. As such, when a set of predetermined rules is executed by the processor 140 of the cloud server 130, a request may be rejected automatically, and execution may be aborted when obtaining at least one NEGATIVE outcome. In some embodiments, more than three outcomes are possible.

Broadly speaking, the cloud server 130 may receive a request to execute an action on an object at an electronic service (not depicted) of the cloud server 130 from a subject user via a device associated with the cloud server 130 (such as one of the client devices 104, 106, 108, and 110). The action may include, among others, reading, writing, appending, executing, deleting, creating, and searching an object. The cloud server 130 may analyze the request, and based on the rule-mapping database 114, retrieve a specific set of rules from the plurality of predetermined rules 240, the specific set of rules being associated with at least one of the subject and the object.

The specific set of rules may generally include policy checks and other conditions to allow execution of the action on the object. The cloud server 130 may execute the specific set of rules sequentially, in parallel or at least partially in parallel, depending on how the processor 140 and/or the cloud server 130 are configured. Generally, as soon as the execution of a rule results in a NEGATIVE outcome, the cloud server 130 may automatically stop execution of other rules of the set of specific rules and refuse the execution of the action by the subject, and may notify the subject that the request has been refused. In some embodiments, the cloud server 130 may execute all rules of the specific set of rules before refusing the execution of the action by the subject.

In some embodiments, the cloud server 130 may use tokens when authorizing requests from subject users. As a non-limiting example, when authorizing a request for the first time, the cloud server 130 may generate a token comprising the specific set of rules associated with the subject user making the request. The cloud server 130 may forward the token with the specific set of rules to the client device (e.g. one of the client devices 104, 106, 108, and 110). Every new request from the subject user via the client device may be intercepted by the cloud server 130 (e.g. by intercepting network traffic via specific ports or intercepting specific request packets) and based on the token, the cloud server 130 may forward the request to the kernel space 147, which may execute the specific set of rules.

Generally, the cloud server 130 may identify, authenticate and grant access to users 103, 105, 107, and 109 on their client devices 104, 106, 108, and 110, via user credentials provided by each one of the users 103, 105, 107, and 109.

The manner in which the user credentials are provided and identity is verified at the cloud server 130 is not limited. As a non-limiting example, the cloud server 130 may identify users 103, 105, 107, and 109 via user identifiers (e.g. ID, username, account number) and authenticate the users 103, 105, 107, and 109 with passwords submitted via an application or a web resource accessed on their respective client devices 104, 106, 108, and 110. In some embodiments, the cloud server 130 may use single-factor authentication, two-factor authentication, multi-factor authentication, strong authentication or continuous authentication methods.

The cloud server 130 may receive a first request 202 from the first client device 104, a second request 212 from the second client device 108, a third request 222 from the third client device 108 and fourth request 232 from the fourth client device 110 over the communication network 102 via respectively the communication links 132, 134, 136, 138. As an example, a user (e.g. one of the users 103, 105, 107 and 109) may access a terminal application on a user device (e.g. one of the client devices 104, 106, 108, and 110), and input a command in the command line to execute a particular action (e.g. delete a file in a folder), which may be translated as a request (e.g. the first request 202, the second request 212, the third request 222, the fourth request 232) and sent to the cloud server 130 over the communication network 102.

The manner in which the first request 202, the second request 212, the third request 222 and the fourth request 232 are implemented is not limited. As a non-limiting example, the requests 202, 212, 222, 232 may be received as fixed-size headers and the predetermined rules may be matched against individual bytes of the headers.

In the illustrated embodiment, the first request 202 may be received by the cloud server 130 from the first client device 104 and be formulated as "SUBJECT=user 1; OBJECT=file 1224; ACTION=DELETE; TIME=2016-12-05T15:54:09+00:00; IP=192.169.222.123".

The cloud server 130 may analyze the first request 202, and based on the SUBJECT and/or OBJECT of the first request 202, analyze the rule-mapping database 114, which contains a reference to rules associated with the SUBJECT and/or OBJECT of the first request 202. The cloud server 130 may then retrieve a first set of predetermined rules 252 from the plurality of predetermined rules 240, the first set of predetermined rules 252 being associated with the subject and/or object of the first request 202. The processor 140 of the cloud server 130 may then execute each rule of the first set of predetermined rules 252. The rules may be executed at least partially in parallel, in parallel, or sequentially by the processor 140 of the cloud server 130. As a non-limiting example, the first set of predetermined rules 252 may contain the following rules for the subject user 1 and/or the file 1224: ACTION=(READ, WRITE, DELETE), TIME=(5 AM to 5 PM), IP RANGE=(192.168.0.0 to 192.168.255.255). The processor 140 of the cloud server 130 may execute each rule of the first set of predetermined rules 252, which may have the following outcome: POSITIVE, POSITIVE, POSITIVE, POSITIVE. The cloud server 130 may thus authorize the action to be executed, as the execution of the first set of predetermined rules 252 has only POSITIVE outcomes, and no NEGATIVE outcomes.

The second request 212 may be formulated as "SUBJECT=user 2; DEVICE=client device 2; OBJECT=program 412; ACTION=EXECUTE; TIME=2016-12-05T15:54:09+00:00; IP=192.168.192.192".

The cloud server 130 may analyze the second request 212, and based on the SUBJECT and/or OBJECT of the second request 212, analyze the rule-mapping database 114, which contains a reference to rules associated with the SUBJECT and/or OBJECT of the second request 212. The cloud server 130 may then retrieve a second set of predetermined rules 254 from the plurality of predetermined rules 240, the second set of predetermined rules 254 being associated with the subject and/or object of the second request 212.

The processor 140 of the cloud server 130 may then execute each rule of the second set of predetermined rules 254. The rules may be executed at least partially in parallel, in parallel, or sequentially by the processor 140 of the cloud server 130. As a non-limiting example, the second set of predetermined rules 254 may contain the following rules for the subject user 2 and/or program 412: ACTION=EXECUTE, DEVICE=ANY, DATE=(FROM 2017-01-01T00:00:00+00:00), TIME=(10 AM to 12 PM), IP RANGE=(192.168.0.0 to 192.168.255.255). The processor 140 of the cloud server 130 may execute each rule of the second set of predetermined rules 254, which may have the following outcome: POSITIVE, DEFAULT NEGATIVE, NEGATIVE, NEGATIVE, POSITIVE.

The cloud server 130 may thus not authorize the execution of the action by the subject on the object, as the execution of the second set of predetermined rules 254 has at least one NEGATIVE outcome. In some embodiments, the processor 140 of the cloud server 130 may stop executing the rules of the second set of predetermined rules 254 as soon as the execution of a rule results in a NEGATIVE outcome.

The third request 222 may be formulated as "SUBJECT=user 3; DEVICE=PHONE; OBJECT=cloud service 32; ACTION=WRITE; TIME=2017-12-05T15:54:09+00:00; IP=192.168.128.1".

The cloud server 130 may analyze the third request 222, and based on the SUBJECT and/or OBJECT of the third request 222, analyze the rule-mapping database 114, which contains a reference to rules associated with the SUBJECT and/or OBJECT of the third request 222.

The cloud server 130 may then retrieve a third set of predetermined rules 256 from the plurality of predetermined rules 240, the third set of predetermined rules 256 being associated with the subject and/or object of the third request 222. The processor 140 of the cloud server 130 may then execute each rule of the third set of predetermined rules 256. The rules may be executed at least partially in parallel, in parallel, or sequentially by the processor 140 of the cloud server 130.

As a non-limiting example, the third set of predetermined rules 256 may contain the following rules for the subject user 3 and/or the cloud service 32: ACTION=(READ, MOVE, WRITE), DEVICE=LAPTOP, TIME=(5 AM to 5 PM), IP RANGE=(192.168.0.0 to 192.168.255.255). The processor 140 of the cloud server 130 may execute each rule of the third set of predetermined rules 256, which may have the following outcome: POSITIVE, NEGATIVE, POSITIVE, POSITIVE. The cloud server 130 may thus not authorize the action to be executed, as the execution of the third set of predetermined rules 256 has at least one NEGATIVE outcome. In some embodiments, the processor 140 of the cloud server 130 may stop executing the rules of the third set of predetermined rules 256 as soon as the execution of a rule results in a NEGATIVE outcome.

The fourth request 232 may be formulated as "SUBJECT=user 4; DEVICE=client device 3; OBJECT=folder; ACTION=MOVE; TIME=2017-12-05T15:54:09+00:00 IP=192.168.123.123".

The cloud server 130 may analyze the fourth request 232, and based on the SUBJECT and/or OBJECT of the fourth request 232, analyze the rule-mapping database 114, and retrieve a reference to rules associated with the SUBJECT and/or OBJECT of the fourth request 232. The cloud server 130 may then retrieve a fourth set of predetermined rules 258 from the plurality of predetermined rules 240.

The cloud server 130 may then retrieve a fourth set of predetermined rules 258 from the plurality of predetermined rules 240, the fourth set of predetermined rules 258 being associated with the subject and/or object of the first request 202. The processor 140 of the cloud server 130 may then execute each rule of the fourth set of predetermined rules 258. The rules may be executed at least partially in parallel, in parallel, or sequentially by the processor 140 of the cloud server 130.

As a non-limiting example, the first set of predetermined rules 252 may contain the following rules for the subject user 4 and/or the file 1224: DEVICE=ANY, ACTION=ANY, TIME=(5 AM to 5 PM), IP RANGE=(192.168.0.0 to 192.168.255.255). The processor 140 of the cloud server 130 may execute each rule of the fourth set of predetermined rules 258, which may have the following outcome: DEFAULT NEGATIVE, DEFAULT NEGATIVE, POSITIVE, POSITIVE. The cloud server 130 may thus authorize the action to be executed, as the execution of the first set of predetermined rules 252 has only POSITIVE or DEFAULT NEGATIVE outcomes, and no NEGATIVE outcomes.

In some embodiments, the cloud server 130 may be configured to prioritize the execution of certain predetermined rules before others e.g. a rule relating to an action may be executed before a time rule.

Figure 3:
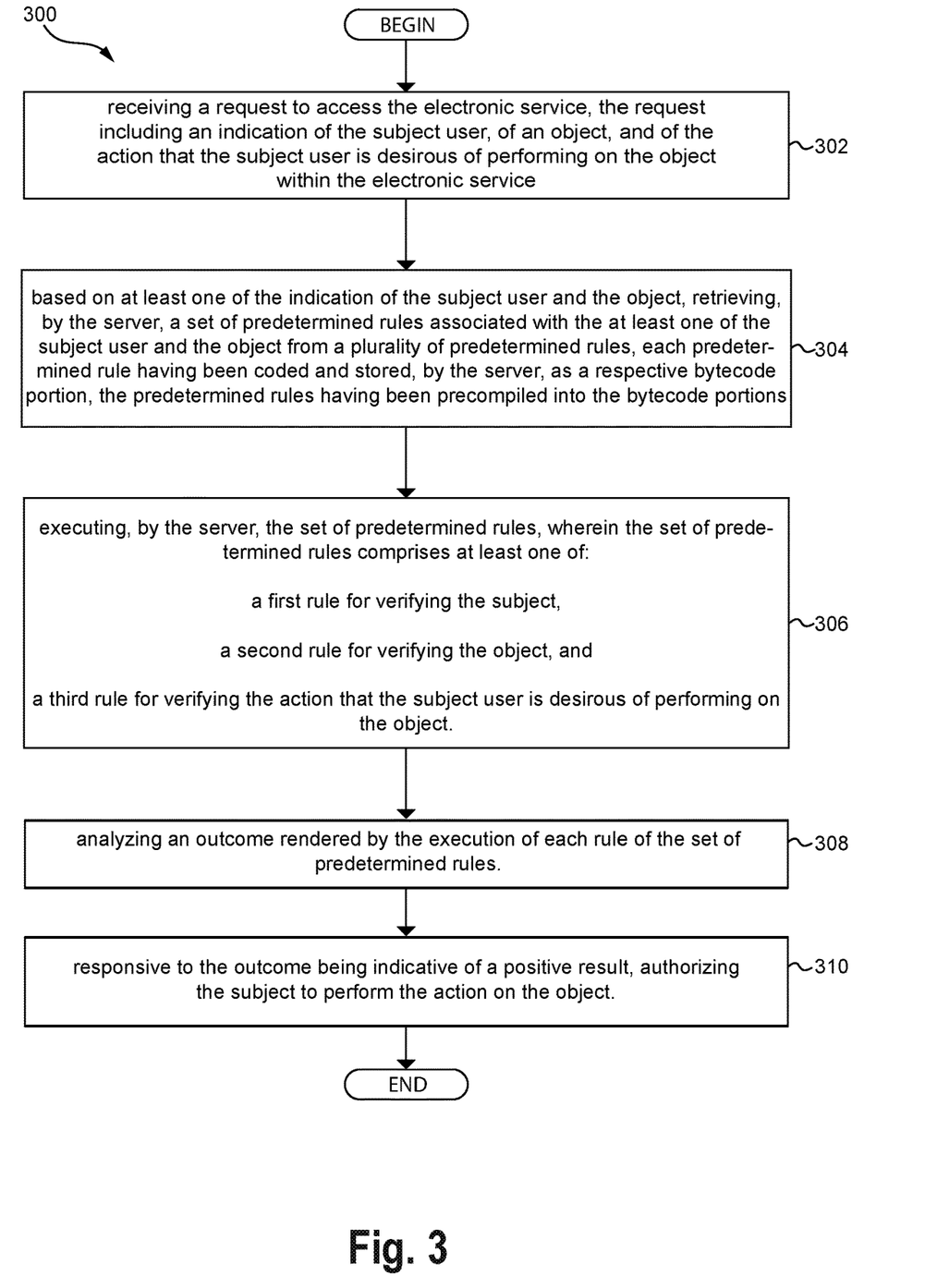
FIG. 3 depicts a block diagram of a method, the method being implemented in accordance with other non-limiting embodiments of the present technology, the method executable within the system of FIG. 1.

Now turning to FIG. 3, a flowchart of a method 300 is executed by the cloud server 130 is illustrated in accordance with non-limiting embodiments of the present technology.

The method 300 starts at step 302.

STEP 302: receiving a request to access the electronic service, the request including an indication of the subject user, of an object, and of the action that the subject user is desirous of performing on the object within the electronic service.

At step 302, the cloud server 130 may receive at least one of the first request 202, the second request 212, the third request 222 and the fourth request 232 from the client devices 104, 106, 108, and 110. Each of the first request 202, the second request 212, the third request 222 and the fourth request 232 may include an indication of a subject, an object and of the action that subject user is desirous of performing on the object within the cloud server 130.

The method 300 then advances to step 304.

STEP 304: based on at least one of the indication of the subject user and the object, retrieving, by the server, a set of predetermined rules associated with the at least one of the subject user and the object from a plurality of predetermined rules, each predetermined rule having been coded and stored, by the server, as a respective bytecode portion, the predetermined rules having been precompiled into the bytecode portions.

At step 304, based on at least one of the indication of the subject user and the object in the first request 202, the second request 212, the third request 222 and the fourth request 232, the cloud server 130 may analyze the rule-mapping database 116 and retrieve respectively the first set of predetermined rules 252, the second set of predetermined rules 254, the third set of predetermined rules 256 and the fourth set of predetermined rules 258 associated respectively with the at least one of the subject user and the object from the plurality of predetermined rules 240, each rule 242 having been coded and stored, by the cloud server 130, as a respective bytecode portion, the predetermined rules 240 having been precompiled into the bytecode portions.

The method 300 then advances to step 306.

STEP 306: executing, by the server, the set of predetermined rules, wherein the set of predetermined rules comprises at least one of:
a first rule for verifying the subject,
a second rule for verifying the object, and
a third rule for verifying the action that the subject user is desirous of performing on the object.

At step 306, the cloud server 130 may execute at least one of the first set of predetermined rules 252, the second set of predetermined rules 254, the third set of predetermined rules 256 and the fourth set of predetermined rules 258, where each set comprises at least one of: a first rule for verifying the subject, a second rule for verifying the object, and a third rule for verifying the action that the subject user is desirous of performing on the object.

The method 300 then advances to step 308.

STEP 308: analyzing an outcome rendered by the execution of each rule of the set of predetermined rules.

At step 308, the cloud server 130 may analyze an outcome rendered by the execution of each rule of at least one of the first set of predetermined rules 252, the second set of predetermined rules 254, the third set of predetermined rules 256 and the fourth set of predetermined rules 258. The outcome of the execution of a rule may be: POSITIVE, NEGATIVE, DEFAULT NEGATIVE.

The method 300 then advances to step 310.

STEP 310: responsive to the outcome being indicative of a positive result, authorizing the subject to perform the action on the object.

At step 310, the cloud server 130 may analyze the outcome of each executed rule of the first set of predetermined rules 252, the second set of predetermined rules 254, the third set of predetermined rules 256 and the fourth set of predetermined rules 258. If at least one rule of the first set of predetermined rules 252, the second set of predetermined rules 254, the third set of predetermined rules 256 and the fourth set of predetermined rules 258 renders a negative outcome, the cloud server 130 may refuse the request (e.g. the first request 202, the second request 212, the third request 222 and the fourth request 232) and may not authorize the subject to perform the action on the object. Otherwise, the cloud server 130 may accept the request and authorize the subject to perform the action on the object.

The method 300 may then end.

While the present technology has been described in the context of a cloud storage server, the present technology may be implemented in any kind of environment requiring access control. As a non-limiting example, the present technology may be implemented for log in and authorization into a physical device, such as a server or a computer. As another non-limiting example, the present technology may be implemented in a local environment (e.g. LAN network) to authorize users such as employees of a company to execute different actions. Employees of the company may connect to different devices, such as scanners, printers, and other devices connected to the network, but have different permissions and conditions to execute actions, e.g. employee A may be allowed to use the scanner between 9 to 5 PM from Monday to Wednesday, while employee B may be allowed to use scanners and printers around all day but only during specific months of the year.

The present technology allows saving computational resources and time when authorizing a request to execute an action by a subject user on an object within an electronic service. Computational resources and execution time may be saved and/or optimized by precompiling rules that act as conditions to authorize the subject user to perform the action on the object within the electronic service. The rules are generally predefined by system administrator(s) and then precompiled, which allows minimizing resources used by the server(s).

Within the present description it should be understood that in any case where retrieving data from any client device and/or from any mail server is mentioned, retrieving an electronic or other signal from corresponding client device (a server, a mail server) can be used, and displaying on a screen of the device can be implemented as transmitting a signal to the screen, the signal includes specific information which further can be interpreted with specific images and at least partially displayed on the screen of the client device. Sending and receiving the signal is not mentioned in some cases within the present description to simplify the description and as an aid to understanding. Signals can be transmitted using optical methods (for example, using fiber-optic communication), electronic methods (wired or wireless communication), mechanic methods (transmitting pressure, temperature and/or other physical parameters by the means of which transmitting a signal is possible.

The invention claimed is:

1. A method for authorizing a subject user to perform an action within an electronic service, the subject user being associated with at least one client device, the subject user being associated with the electronic service, the electronic service being executed at a server, the at least one client device being connected to the server via a communication network, the method comprising:
   receiving, by the server from the at least one client device, a request to access the electronic service, the request including an indication of the subject user, of an object, and of the action that the subject user is desirous of performing on the object within the electronic service;
   based on at least one of the indication of the subject user and the object, retrieving, by the server, a set of predetermined rules associated with the at least one of the subject user and the object from a plurality of predetermined rules, each one of the plurality of predetermined rules having been coded and stored, by the server, as a respective bytecode portion, the plurality of predetermined rules having been precompiled into the bytecode portions;
   each rule of the set of predetermined rules being indicative of a respective condition associated with the subject to be met to authorize the subject to perform the action on the object, and comprising a respective precompiled bytecode portion indicative of at least one of:
      a first rule for verifying the subject,
      a second rule for verifying the object, and
      a third rule for verifying the action that the subject user is desirous of performing on the object;
   executing, by the server, each rule of the set of predetermined rules independently in parallel;
   analyzing an outcome rendered by executing of each rule of the set of predetermined rules; and
   responsive to any rule of the set of predetermined rules rendering a negative outcome:
      aborting, by the server, executing remaining rules of the set of predetermined rules;
      refusing, by the server, the request of the subject user to perform the action on the object.

2. The method of claim 1, wherein the set of predetermined rules is retrieved from a rule mapping database, the rule mapping database mapping each of subject users and each of objects to an associated rule of the predetermined rules.

3. The method of claim 2, wherein each rule of a subset of the set of predetermined rules corresponds to a respective action to be performed by the subject user on a respective object.

4. The method of claim 3, wherein the predetermined rules have been further precompiled into a machine code, and wherein the plurality of predetermined rules are stored as the machine code.

5. The method of claim 4, wherein the predetermined rules are executed independently in parallel by a plurality of processors of the server.

6. The method of claim 5, wherein the subject user is one of: a user, a group of users and a process.

7. The method of claim 6, wherein the object is one of: a file, a type of file, a directory, a process, and a program.

8. The method of claim 7, wherein the action is one of: reading, writing, appending, executing, deleting, creating, and searching.

9. The method of claim 8, wherein the electronic service is a cloud service.

10. The method of claim 9, wherein the method is executable at the kernel level of the server.

11. The method of claim 10, wherein the method is executable in a virtual machine of the server.

12. The method of claim 1, wherein the analyzing of the outcome rendered by the execution of the set of predetermined rules comprises determining if a given outcome of a given predetermined rule is one of a positive, negative and default negative.

13. The method of claim 12, wherein the outcome is considered to be indicative of the positive result in response to a totality of given outcomes of the set of predetermined rules not rendering a negative outcome.

14. The method of claim 13, wherein the outcome is considered to be indicative of the positive result in response to the totality of given outcomes of the set of predetermined rules rendering one of a positive and a default negative outcomes.

15. A system for authorizing a subject user to perform an action within an electronic service, the subject user being associated with at least one client device, the subject user being associated with the electronic service, the at least one client device being connected to the system via a communication network, the system comprising:
   at least one processor;
   a non-transitory computer-readable medium comprising instructions;
   the at least one processor, upon executing the instructions, being configured to:
      receive, from the at least one client device, a request to access the electronic service, the request including an indication of the subject user, of an object, and of the action that the subject user is desirous of performing on the object within the electronic service;
      based on at least one of the indication of the subject user and the object, retrieve a set of predetermined rules associated with the at least one of the subject user and the object from a plurality of predetermined rules, each one of the plurality of predetermined rules having been coded and stored as a respective bytecode portion, the plurality of predetermined rules having been precompiled into the bytecode portions, wherein:

each rule of the set of predetermined rules being indicative of a respective condition associated with the subject to be met to authorize the subject to perform the action on the object, and comprising a respective precompiled bytecode portion indicative of at least one of:
a first rule for verifying the subject,
a second rule for verifying the object, and
a third rule for verifying the action that the subject user is desirous of performing on the object;

execute each rule of the set of predetermined rules independently in parallel;

analyze an outcome rendered by executing of each rule of the set of predetermined rules; and responsive to any rule of the set of predetermined rules rendering a negative outcome:
abort executing remaining rules of the set of predetermined rules;
refuse the request of the subject user to perform the action on the object.

16. The system of claim 15, wherein the set of predetermined rules is retrieved from a rule mapping database, the rule mapping database mapping each of subject users and each of objects to an associated rule of the predetermined rules.

17. The system of claim 16, wherein each rule of a subset of the set of predetermined rules corresponds to a respective action to be performed by the subject user on a respective object.

18. The system of claim 17, wherein the predetermined rules have been further precompiled into a machine code, and wherein the plurality of predetermined rules are stored as the machine code.

19. The system of claim 17, wherein to execute the predetermined rules independently in parallel, the server comprises a plurality of processors.

20. The system of claim 15, wherein the analyze the outcome rendered by the execution of the set of predetermined rules, the at lesat one processor is configured to determine if a given outcome of a given predetermined rule is one of a positive, negative and default negative.

* * * * *